United States Patent [19]

Bougiouris

[11] 4,354,780
[45] Oct. 19, 1982

[54] MAKING FORMED MILLED CUTTERS AND KEY CUTTERS

[75] Inventor: Evangelos Bougiouris, Auburn, Mass.

[73] Assignee: Ilco Unican Corp., Rocky Mount, N.C.

[21] Appl. No.: 152,614

[22] Filed: May 23, 1980

[51] Int. Cl.³ .............................................. B23C 3/28
[52] U.S. Cl. ..................... 409/122; 76/112; 125/11 F; 409/3; 409/124
[58] Field of Search ................... 409/3, 121, 122, 124; 125/11 F; 76/101 A, 112

[56] References Cited

U.S. PATENT DOCUMENTS

| 970,554 | 9/1910 | Riddell | 409/121 |
| 1,277,375 | 9/1918 | Butters | 76/112 |
| 1,302,540 | 5/1919 | Hanson | 409/122 X |
| 2,324,242 | 7/1943 | Seeck | 409/3 |
| 2,506,734 | 5/1950 | O'Brien | 409/122 X |

FOREIGN PATENT DOCUMENTS 509480 10/1930 Fed. Rep. of Germany .... 125/11 F

Primary Examiner—Z. R. Bilinsky

[57] ABSTRACT

A machine forming teeth about the periphery of a round blank which has two faces at an angle to each other, and a peripheral edge. The teeth are to appear at both faces and the edge. A single rotary tooth cutter is given a single path to cut each tooth and is controlled by a template to cut one side face, the edge, and the other side face seriatim in one continuous pass. A cam is used to impel the cutter and its drive shaft along its path.

7 Claims, 12 Drawing Figures

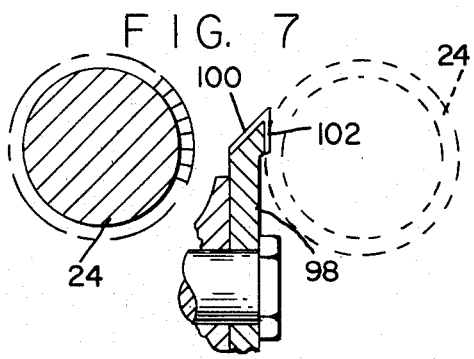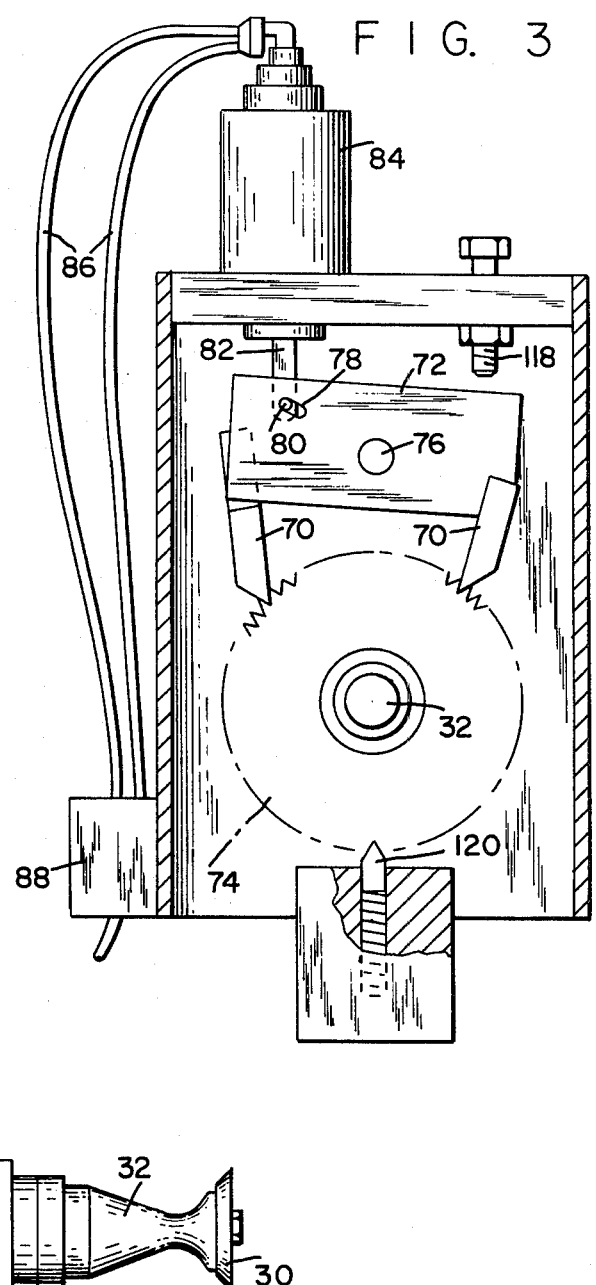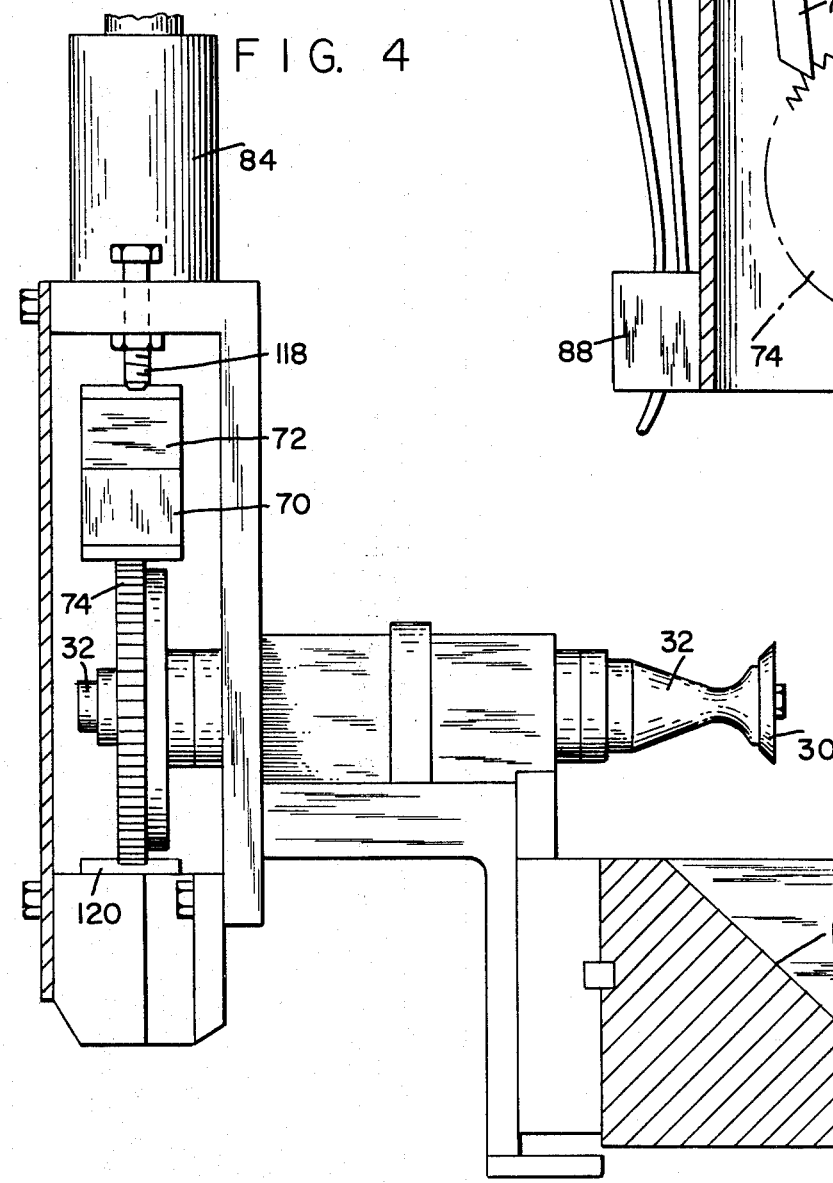

MAKING FORMED MILLED CUTTERS AND KEY CUTTERS

BACKGROUND OF THE INVENTION

Form milling cutters and key cutting tools are examples of rotary cutters which have convergent side faces in which teeth are cut and a peripheral edge which is slightly rounded, flat, or pointed and which is also cut so that the individual teeth are continuous from one side surface, across the periphery, and down the other side surface. These cutters may have a substantially flat face and a face which is angular with respect thereto, or both cutting faces may be at angles with respect to a central plane.

Originally, these cutters were made with three separate cutters or with plural cams because of the fact that there must be separate cuts made in order to accomplish the cutting edges desired.

It is the object of this invention to do the complete operation in one machine with a single cutter making a continuous pass.

PRIOR ART

The closest prior art that the applicant is aware of is U.S. Pat. No. 3,739,687 "Machine Forming Teeth at Both Faces and the Perephiry of a Rotary Blank". In this machine, the blanks were finished in a single position but three separately operated rotary cutters were used, one for making each of the three cuts in series, wherein two of the cutters operated on the blank at the opposite side faces thereof, wherein such side faces are converging and the third cutter operated in time relation on the peripheral edge of the blank, so that all three cutters were operated to make each single tooth.

Other U.S. Pat. Nos. of interest are:

1,929,025—a process and apparatus for accurately cutting and rectifying gears. The apparatus uses a profiling piece or template to give the correct angle of cut to the work piece. The apparatus can be used for cutting conical, spiral and bevel gears, gears having either convex or concave angle teeth. For each gear type cut, there is a corresponding profiling plate, depending upon the characteristics of the cut.

1,987,832—an abrading machine for grinding rotary cutting blades around the peripheral edge of the curved cutting teeth and the radial faces of the teeth.

2,097,664—a grinding machine for reamers and like tools, having a yoke-type mounting, which allows the motor and grinding arm to move in a vertical plane. A cam is mounted in fixed relation to the work. By contact with the cam, the motor and grinding wheel are moved pivotally and the angle at which the grinding wheel contacts the work is governed by the cam. The machine also provides indexing means that shows the operator the exact angle being cut.

2,130,627—a machine for preparing tires for retreading, which has motor driven cutting and rasping blades attached to an oscillatory carriage, for moving the cutters transversely around the work piece as the work piece rotates.

2,342,129—production of bevel gears, using a guide or template for cutting and shaping the gear teeth.

2,787,869—a grinding machine for grinding and feathering turbine blades, wherein a template is used for obtaining the proper contour of the turbine blade.

2,803,095—a hydraulic tracer control of a grinder, shaper and the like, which uses a template to position a valve which, in turn, will move the grinding head accordingly.

2,956,376—a universal grinding apparatus, which uses a template or guide plate for grinding, and has a pawl and ratchet set-up for work advancing automatically.

3,073,076—a radius cutter grinding machine, having the motor, grinding wheel, spindle and tubular bearing members mounted in a floating, adjustable fashion in relation to the work piece.

3,122,864—an automatic profiling machine, wherein a template or pattern is used to reproduce a profile. The pattern and the work piece is rotated together through an indexing mechanism for grinding the proper profile.

3,162,987—a machine for sharpening cutter blades, having contoured cutting edges, wherein a grinder assembly is pivotally mounted. A template, having a contoured camming surface, whereby the grinding assembly is moved in a path which conforms to the contour of the blade to be sharpened.

3,739,687—a machine for forming cutting teeth at both faces and the periphery of a rotary blank, having three separately operated rotary cutters and an indexing means for the rotary blank.

3,751,856—a profile copying machine, which uses a stylus wheel in conjunction with a grinding wheel, which are arranged parallel to each other. They are mounted on a pivoted platform to rest on a model or fixed template and the work piece.

SUMMARY OF THE INVENTION

The present machine is especially adapted to mill the teeth in the peripheral area of a round blank to make e.g. form or key cutters. The teeth appear at both sides of the peripheral area of the finished product and also extend across the peripheral edge. A carbide cutter is mounted on an arm having a universal joint or the like at one end. This cutter is located relatively close to the pivot axis of the universal. The arm has a conical shaped cam (or follower) at the distal end of the arm, this cam being connected with respect to a mechanism for causing the arm to move on its pivots to accomplish at least three and in some cases four separate motions for the carbide cutter. These motions are generally in a continuous line and cut in a single pass the cutter teeth above referred to, e.g. on both sides of the round blank and across the top of the peripheral edge thereof.

The mechanism for moving the arm and its cutter comprises a rotatably mounted member having a spring loaded block thereon to which is connected the terminal end of the arm referred to above. This rotary member is oscillated by a reciprocatory rack which moves back and forth to produce a clockwise and counterclockwise motion of the rotary member, reversal being accomplished by means of microswitches at either end portion of the rack.

This construction causes the aforesaid conical cam to remain in close contact with respect to a special template which is in fixed position but which is also removable and replaceable by other templates for different types of key cutters to be made. The carbide cutter cuts the teeth on the blank as above stated according to the template. The cam is tapered because it can be axially adjusted to provide for the carbide cutter to cut deeper or shallower.

The blank is indexed by an escape mechanism controlled by microswitches in turn controlling a solenoid which operates an air or hydraulic cylinder to actuate the escape mechanism. All of the microswitches are adjustable in position to vary the period of index and oscillation.

In most cases, two surfaces of the cutter blank are at an angle to each other, and when this is the case, the carbide cutter can run down off the tapered or angular tooth part and the blank can then be indexed of the work, so that the carbide cutter can cut another tooth on its return stroke. However, if one or both of the side faces of the blank are in a plane at right angles to the axis of the blank, then it is necessary to return the cutter to original position i.e., run off an angle portion thereof in order to become free of the work to allow indexing.

BRIEF DESCRIPTION OF THE DRAWINGS

FIG. 3 is a section on line 3—3 of FIG. 2 with parts in section;

FIG. 4 is a section on line 4—4 of FIG. 2;

FIG. 7 is a sectional view which illustrates the action of the carbide cutter for one form of key cutter being made;

PREFERRED EMBODIMENT OF THE INVENTION

Figure 1:
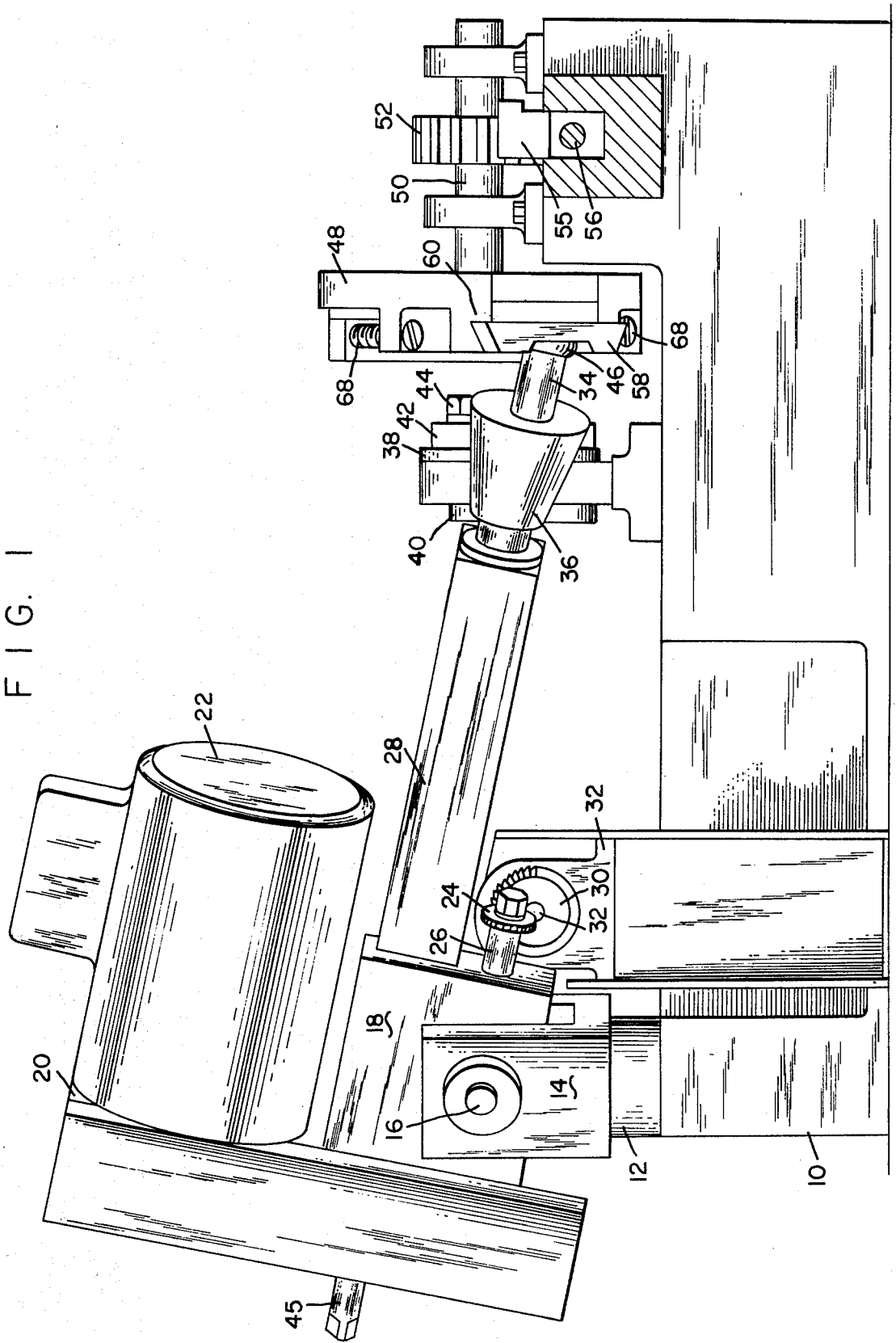
FIG. 1 is a view of in side elevation, partly in section, illustrating the invention.
Figure 2:
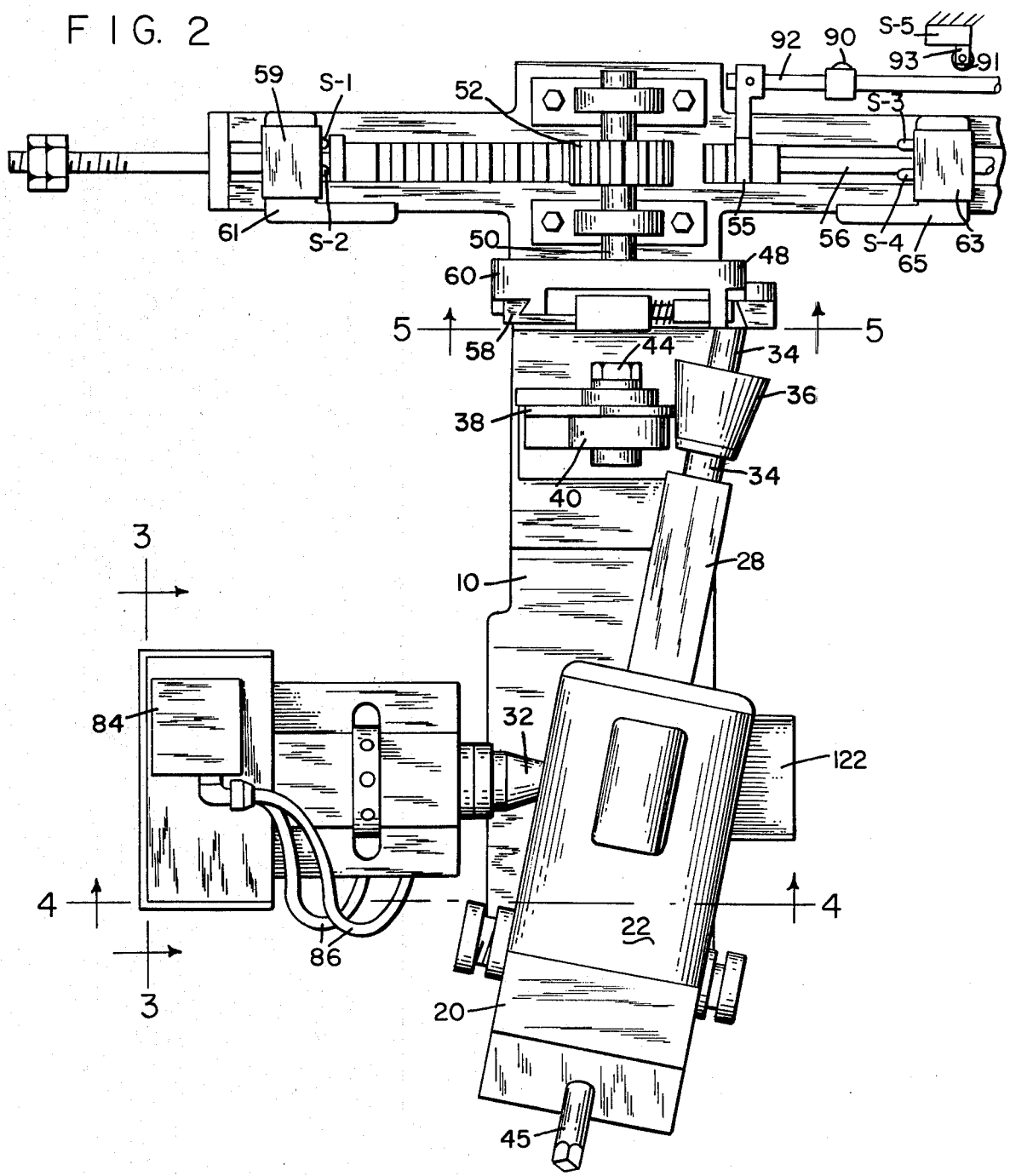
FIG. 2 is a top plan view thereof.

Referring now to FIGS. 1 and 2, any kind of base may be provided and on the base there is a swivel or pivot member 12 on a vertical axis which mounts a U-bracket 14 in turn providing a horizontal pivot 16 for support of a block 18, for general universal motion thereof. On block 18 there is provided a supporting bracket 20 for a motor 22. Gearing or belts not shown drive a carbide cutter 24 on a shaft 26 by means of the motor.

Block 18 is provided with an extending fixed arm 28 which of course can move according to the pivot axes at 12 and 16. As arm 28 is moved, so also will move the carbide cutter 24. The work, circular blank 30, is mounted on a rotary support 32 and is provided with indexing means to be later described and as shown in FIG. 3. The blank 30 is mounted on a rod or shaft 32.

At the end of arm 28 opposite the block 18 and the carbide cutter there is a shaft 34 on which is adjustably mounted a conical cam or cam follower 36. This cam is free to rotate and does so in contact with template 38. This template 38 is removably clamped in position by any suitable means, e.g. clamp block 40 and bolts and nuts as at 44. The cam or follower 36 may be adjusted axially by a screw rod 45.

Figure 6:
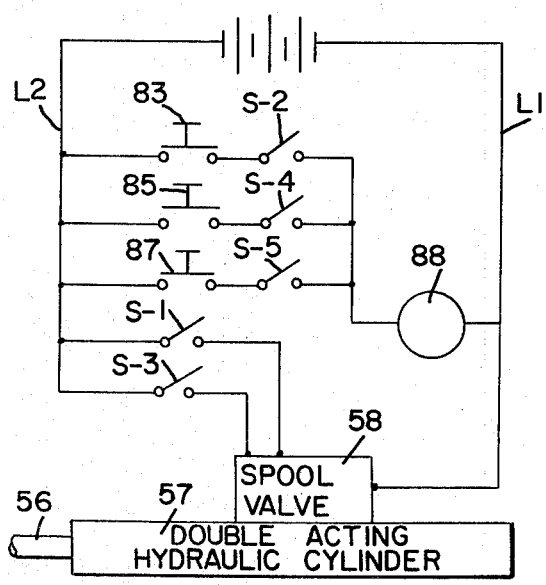
FIG. 6 is a diagram of a part of the control system.

The extreme end of the shaft 34 is connected by a ball and socket arrangement 46 to a rotarily mounted circular member 48 having a shaft 50 by which it is turned by a gear 52, the gear 52 being engaged by a rack 54, reciprocated by a piston rod 56 connected to a double acting cylinder and piston 57, see FIG. 6.

Referring particularly to FIGS. 2 and 6, double acting cylinder 57 is controlled by a spool valve 58 provided with appropriate electrical controls. Spool valve 58 is connected to a first power line L1 and is actuated upon connection to the other power line L2 through either microswitch S-1 or S-3. Actuation of spool valve 58 through switch S-1 causes the rod 56 to be driven outwardly of cylinder and piston unit 57, to the left as viewed in FIGS. 2 and 6. Actuation of spool valve 58 through switch S-3 causes the rod 56 to be driven toward the piston and cylinder unit 57.

The ends of rack 54 are provided with vertically extending arms 53 and 55 as shown in FIG. 2. A microswitch unit 59 is mounted on a longitudinally adjustable bracket 61 and contains previously described switch S-1 and indexing switch S-2 to be described. A similar microswitch unit 63 is mounted on an adjustable bracket 65 and contains previously described switch S-3 and indexing switch S-4. Arm 53 closes switches S-1 and S-2 as the rack 54 moves to the left in FIG. 2 and arm 55 closes switches S-3 and S-4 as the rack 54 moves to the right in FIG. 2. Since switches S-1 and S-3 cause the rack to reverse its direction of travel through actuation of piston cylinder unit 57, the rack 54 will reciprocate causing rotary member 48 to oscillate.

Figure 5:
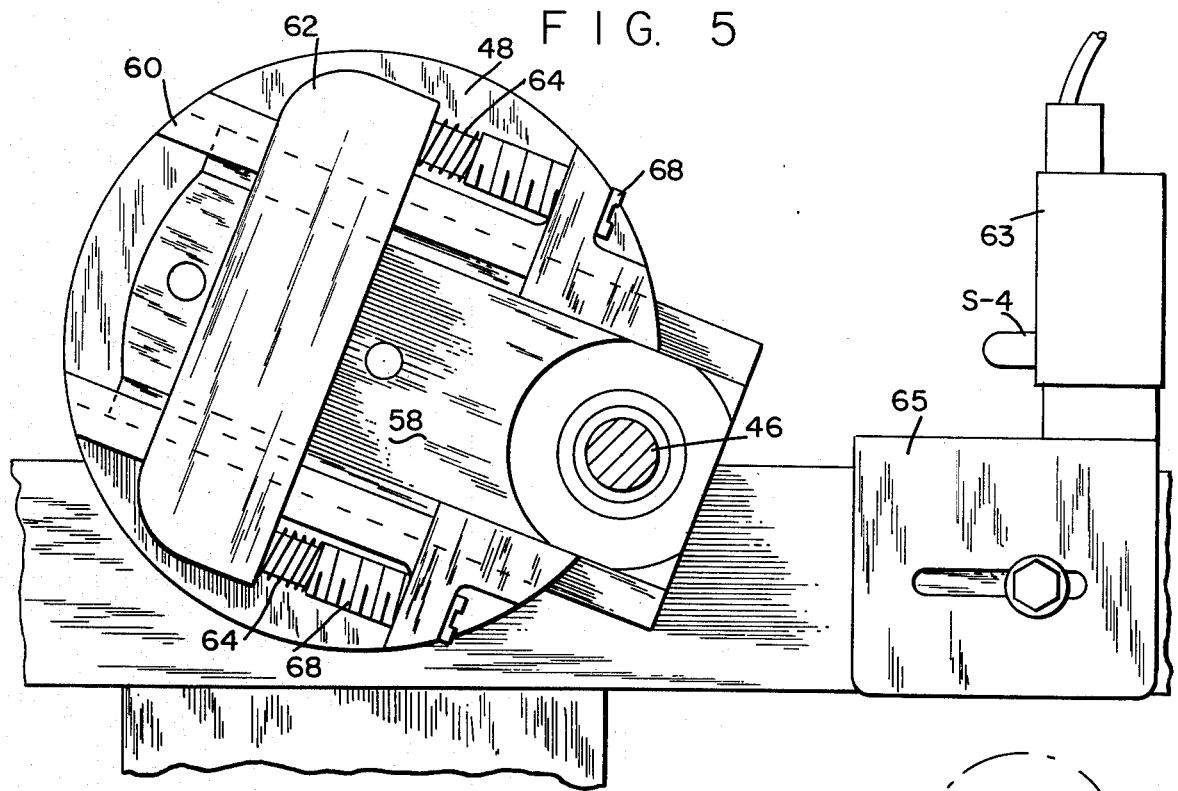
FIG. 5 is a section on line 5—5 of FIG. 2.

The rotary member 48 is best seen in FIG. 5 wherein the ball and socket joint 46 is indicated mounted on a sliding block 58 in guides 60 on the rotary member 48.

Figure 10:
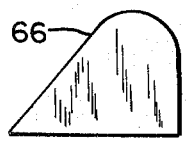
FIGS. 10, 11 and 12 illustrate different forms of templates which may be used by this apparatus to form different shapes of teeth.
Figure 11:
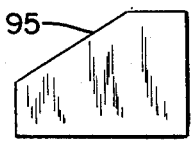
Figure 12:

The block 58 can slide and does so as member 48 is oscillated. The cam 36 is held to the template according to the template 38 by means of a plate 62 springloaded as at 64, 64 to control the sliding motion of the block and therefore of the ball and socket 46. For this reason the cam (or the cam follower) 36 is closely held to the peripheral edge of template 38, as shown in FIGS. 10, 11 and 12, the carbide cutter is strictly guided by the outline of the template as for instance indicated by the reference numeral 66, see FIG. 10. Springs 64 can be adjusted by means of set screws or the like 68.

The work support 32 is indexed by an escape mechanism indicated at 70, 72 including indexing plate 74. The member 72 is mounted on a pivot at 76 and it has an angular slot 78 having a pin 80 therein, the pin being mounted on rod 82 which is under control of a pneumatic or hydraulic cylinder 84.

This cylinder is operated through tubes 86 by means of a solenoid 88. This solenoid is actuated by means of microswitches S-2, S-4 or S-5, see FIG. 6. The microswitches S-2, S-4, or S-5 can be selectively rendered operable or inoperable by means of manual switches 83, 85 and 87 respectively. Switch S-2 is closed simultaneously with switch S-1 when the rack 54 reaches the end of its left-hand motion as viewed in FIG. 2. Switch S-4 is closed simultaneously with switch S-3 when the rack 54 reaches the end of its right-hand motion as viewed in FIG. 2. Switch S-5 is fixed to the machine frame and is closed by a cam 90 adjustably mounted on a rod 92 attached to extending arm 55. Switch S-5 may be of a type that closes on each pass of the cam 90 or the type that is closed on one pass of the cam 90. For example, switch S-5 is shown in FIG. 2 as including a roll 91 attached to the end of a plunger 93 that is pushed in each time that the roll 91 is struck by the cam 90 to close a contact within the switch. If it is desired to close switch S-5 on only one pass, the portion of the switch that is engaged by cam 90 would be a pivoted arm biased in a neutral position that is effective to close a contact when the arm is moved in one direction only. In this way, solenoid 88 can be selectively actuated at either or both end positions of the cutter or at any point between the end positions. The workpiece 30 is indexed the distance of one tooth each time that solenoid 88 is actuated.

Referring to FIG. 7, there is here shown an example of a workpiece 98 being operated upon by the carbide cutter 24. It will be seen that the work 98 has the two surfaces to be cut at 100 and 102. Obviously indexing cannot take place while the cutter is engaged with the work. If the cutter is going from right to left, that is, first up and then down to the left, it does not cut, but moves inoperatively along the portion 102 of the tooth and then the portion 100. Then it rides off the work to the solid line position (of cutter 24) whereupon the indexing will take place. The cutter then reverses direction while making the next tooth. It will be noticed, however, that this is the only index that can take place because in the dotted line showing of cutter 24 the latter is not able to go radially inwardly relative to the cutter to a sufficient degree to completely become disengaged from the work, and therefore no indexing can take place at this side of the cut, i.e. the cutter must return along its already cut portion 102 and 100 to the solid line position before the indexing can take place. The template configuration for the workpiece shown in FIG. 7 is illustrated in FIG. 10, at 66.

Figure 8:
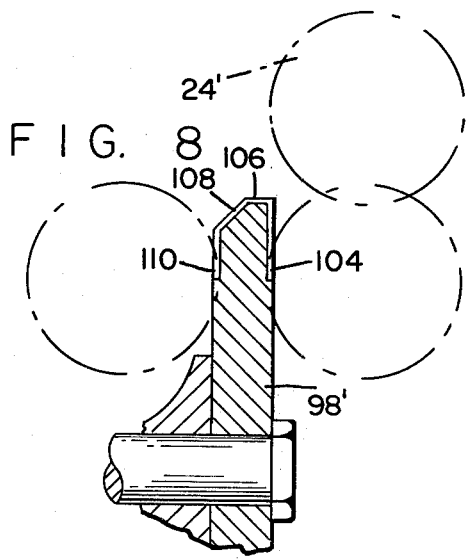
FIG. 8 illustrates the cutter motion for a different key cutter.
Figure 9:
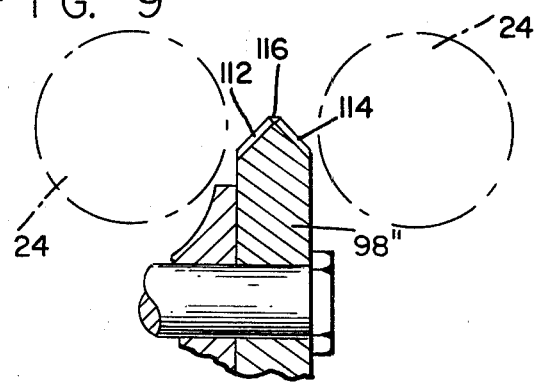
FIG. 9 shows the cutter motion for a still different key cutter to allow for indexing.

Further explanation is shown in FIGS. 8 and 9. In FIG. 8 the work is indicated at 98' and in this case, an unusual one, there are four parts to the cut: 104, 106, 108 and 110. In this case no indexing can take place unless the cutter is in position 24'. Therefore, when the work indexes, cutter 24 moves to the left and makes the cuts at 106, 108 and 110 and reverses till it comes back to the lowermost position to cut the tooth part 104. Then it is reversed to the position of 24', and the index operates.

For the workpiece shown in FIG. 8, switches S-2 and S-4 are rendered inoperative by manual switches 83 and 85 and switch S-5 is rendered operative by manual switch 87. In addition switch S-5 is actuated by cam 90 as it moves in one direction. This is only necessary if the workpiece has an even number of teeth. If the workpiece has an odd number of teeth, indexing at position 24' can occur at end pass. Odd numbered teeth will be cut on one side and even numbered teeth on the other. At the end of one complete revolution of the workpiece, the even numbered teeth will be cut on the first side of the blank and the odd numbered teeth will be cut on the other side. The template configuration for the workpiece of FIG. 8 is identified at 95 in FIG. 11.

In FIG. 9, the work is indicated at 98". Here the cutter slides off of the cuts to be made as at 112 and 114 at either side of the cutter, even though there may also be a traverse cut at 116 as has been described above relative to the normal key cutting cutter. In any event, the cutter 24 moves up e.g. to form the cut at 114, moves across to make cut 116, and then moves down to make the cut at 112, passing off the tooth out of engagement with the work, at the left hand side of the figure, whereupon an indexing takes place. Then the cut is made in the reverse direction and once more an index is made, so in this case there is an index at each side of the cutter 98".

For this particular workpiece, switches S-2 and S-4 are both operative so that indexing occurs at each end of the oscillation of the cutter 24. The template configuration for the workpiece is indicated at 97 in FIG. 12.

The indexing mechanism is also provided with an adjustable stop at 118, a locking pin 120, and a chute at 122 may be provided, see FIG. 4, for the purpose of receiving the completed work.

I claim:

1. A milling machine for cutting teeth in the peripheral area of a circular blank, comprising:

an arm, a universal joint mounting said arm at one end thereof, a rotary cutter mounted on said arm adjacent to the universal joint, a motor to rotate said cutter, a template adjacent to the opposite end of the arm, means at said opposite end of the arm to move the arm and its cutter in a pattern controlled by the template, comprising a cam follower on said arm in the area of the template, a rotationally mounted member and means to oscillate the same, a generally diametrical guide on the rotationally mounted member, a block in the guide, a connection from the arm to the block, and resilient means on the rotationally mounted member constantly biasing the block in a direction to cause the arm to engage the cam follower with the template, whereby oscillatory motion of the rotationally mounted member causes the cutter to be bodily moved in a certain direction, then translated, and thereafter moved in the opposite direction and returned in operative cutting relation to the circular blank, and means to index the blank between the formation of each complete cut.

2. In a machine for milling teeth in the peripheral area of a circular blank which has two side faces with portions adjacent to its periphery that are disposed at an angle to one another;

A. an elongated arm having a universal pivotal mounting at one end portion thereof;

B. a power driven cutter mounted on the arm for bodily motion therewith and for rotation relative to the arm;

C. a stationary template mounted at a location near the opposite end portion of the arm and having a protuberance of predetermined shape on a peripheral portion thereof that faces toward the arm;

D. a follower mounted on the arm alongside said peripheral portion of the template;

E. means biasing the arm in a direction to maintain said follower in engagement with said peripheral portion of the template;

F. and an oscillatable member having a ball and socket connection with said opposite end of the arm, by which the arm is rockable about its universal pivotal mounting to carry said follower back and forth along said peripheral portion of the template and over the protuberance thereon, whereby travel of the follower in one direction over said protuberance effects cutting of a tooth in the blank in consequence of the resulting bodily movement of the cutter first along one of said side portions of the blank toward its periphery, then across its periphery and along the other of said side portions of the blank, away from its periphery.

3. The machine of claim 2, including means for indexing the blank after cutting of said tooth on the blank.

4. The machine of claim 3, wherein travel of the follower in the opposite direction over said protuberance on the template effects cutting of the next adjacent tooth in the blank.

5. The machine of claim 2, wherein said cutter is located closer to the universal pivot for the arm than to said follower.

6. The machine of claim 2, wherein the follower is conical, and further characterized by means for adjusting its position relative to the length of the arm and to the peripheral portion of the template with which it is cooperable.

7. The machine of claim 2, further characterized by means to effect oscillatory motion of said oscillatable member, comprising
- a reciprocatory element and means to effect reciprocation thereof;
- and means connected with said oscillatable member and with said reciprocatory element for translating reciprocation of the latter into oscillatory movement of said oscillatable member.

* * * * *